US012693505B2

(12) United States Patent
Lee

(10) Patent No.: US 12,693,505 B2
(45) Date of Patent: Jul. 28, 2026

(54) OPTICAL LENS ASSEMBLY

(71) Applicant: NEWMAX TECHNOLOGY CO., LTD., Taichung City (TW)

(72) Inventor: Chun-Sheng Lee, Taichung City (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 302 days.

(21) Appl. No.: 18/509,911

(22) Filed: Nov. 15, 2023

(65) Prior Publication Data

US 2025/0085517 A1     Mar. 13, 2025

(30) Foreign Application Priority Data

Sep. 13, 2023     (TW) ................................. 112134950

(51) Int. Cl.
*G02B 13/18*          (2006.01)
*G02B 9/62*           (2006.01)

(52) U.S. Cl.
CPC .............. *G02B 13/18* (2013.01); *G02B 9/62* (2013.01)

(58) Field of Classification Search
CPC ...... G02B 13/18; G02B 9/62; G02B 13/0045; G02B 13/0015; G02B 13/06; G02B 13/14; G02B 15/145523; G02B 9/64; G02B 13/04; G02B 27/0025; G02B 13/002; G02B 13/00; G02B 9/58; G02B 15/177; G02B 3/02; H04N 23/55; G03B 30/00

See application file for complete search history.

(56) References Cited

U.S. PATENT DOCUMENTS

2021/0026109 A1*   1/2021   Song ......................... G02B 9/62
2022/0236531 A1*   7/2022   Chang ...................... G02B 9/62

FOREIGN PATENT DOCUMENTS

CN         109541785 A   *   3/2019   ............. G02B 13/18
WO    WO-2020019796 A1   *   1/2020   ............. G02B 13/18

* cited by examiner

*Primary Examiner* — Matthew Y Lee
(74) *Attorney, Agent, or Firm* — Juan Carlos A. Marquez; Marquez IP Law Office, PLLC

(57) ABSTRACT

An optical lens assembly includes a stop, and includes, in order from the object side to the image side: a first lens, a second lens, a third lens, a fourth lens, a fifth lens, and a sixth lens; wherein a distance from an object-side surface of the first lens element to the image plane along the optical axis is TL, a focal length of the system is f, a maximum field of view of the optical lens assembly is FOV, a maximum optical effective radius of the object-side surface of the first lens is CA1, and the following condition is satisfied: $702.32 < TL*(f*FOV)/CA1 < 1286.23$.

14 Claims, 6 Drawing Sheets

OPTICAL LENS ASSEMBLY

CROSS-REFERENCE TO RELATED APPLICATION

This application claims the benefit of Taiwan Patent Application No. 112134950, filed on Sep. 13, 2023, which is hereby incorporated by reference for all purposes as if fully set forth herein.

BACKGROUND

Technical Field

The present disclosure relates to an optical lens assembly, and in particular, to an optical lens assembly applicable to an electronic device.

Related Art

Currently, ultra-wide-angle lens modules are widely used in various technological fields to meet various needs, and include technical applications such as photography, monitoring equipment, automation equipment, and around view monitor systems. However, the ultra-wide-angle lens module of previous Internet of Things (IOT) has a serious problem that seriously limits its technical application scope. The ultra-wide-angle lens module of previous IOT usually has a higher height of the lens module, which is inappropriate for many special technical applications and the IOT devices located in a limited space. The high height of the lens module limits the physical configuration of the IOT device, and makes many technical applications impossible or seriously limited.

In addition, the ultra-wide-angle lens module of previous IOT require large optical elements and complex lens layouts to maintain a high-quality image, which not only increases manufacturing costs but also increases system complexity, such that design and integration are difficult. This situation has seriously hindered the ultra-wide-angle lens module of previous IOT from popularization and practicalization, especially in technical application environments with limited resources. In short, the ultra-wide-angle lens modules of previous IOT have fundamental problems in terms of performance, cost, and feasibility, wherein the fundamental problem is an urgent problem to be solved in this technical field.

SUMMARY

An objective of the present disclosure is to resolve the above problems of the prior art. In order to achieve the above objective, the present disclosure provides an optical lens assembly comprising a stop, and in order from an object side to an image side, comprising: a first lens with negative refractive power, comprising an object-side surface and an image-side surface, wherein the object-side surface of the first lens is convex near the optical axis; a second lens with positive refractive power; a third lens with positive refractive power; a fourth lens with negative refractive power; a fifth lens with positive refractive power; and a sixth lens with negative refractive power, comprising an object-side surface and an image-side surface, wherein the image-side surface of the sixth lens is concave near the optical axis.

A total quantity of lenses with refractive power in the optical lens assembly is six. A distance from an object-side surface of the first lens to an image plane along the optical axis is TL, a focal length of the system is f, a maximum field of view of the optical lens assembly is FOV, a maximum optical effective radius of the object-side surface of the first lens is CA1, a maximum optical effective radius of the image-side surface of the sixth lens is CA12, an incident angle where a chief ray is incident on an image plane at a maximum view angle of the optical lens assembly is CRA, a maximum image height of the optical lens assembly is IMH, a distance from the image-side surface of the sixth lens to the image plane along the optical axis is BFL, a distance in parallel with the optical axis from an axial point on the image-side surface of the sixth lens to a maximum optical effective radius position of the image-side surface of the sixth lens is TDP12, an entrance pupil diameter of the optical lens assembly is EPD, a maximum optical effective radius of the image-side surface of the first lens is CA2, a curvature radius of the image-side surface of the first lens is R2, a focal length of the third lens is f3, a focal length of the fifth lens is f5, a distance from the stop to the image plane along the optical axis is SL, and at least one condition is satisfied as follows:

$$702.32 \text{ mm} *° < TL * (f * FOV)/CA1) < 1286.23 \text{ mm} *°;$$

$$26.85° < (CA1/CA12) * CRA < 53.06°;$$

$$34.51° < (IMH/CA12) * CRA < 58.29°;$$

$$51.3° < ATAN((BFL - TDP12)/(IMH - CA12)) < 85.83°;$$

$$30.55° < (IMH/CA12) * CRA < 58.19°;$$

$$12.42 \text{ mm} < TL * CA1/EPD < 26.15 \text{ mm};$$

$$21.84 \text{ mm} < TL * (FOV/CRA) < 38.12 \text{ mm};$$

$$101.34° < (TL * CRA)/f < 175.96°;$$

$$6.85 \text{ mm} < TL * (IMH/f < 11.55 \text{ mm};$$

$$1.65 \text{ mm} < TL * EPD/IMH < 2.76 \text{ mm};$$

$$1.33 < (2 * CA2)/R2 < 2.27;$$

$$2.12 < (CA1/CA12) * (TL/IMH) < 4.10;$$

$$12.72 \text{ mm} < TL * (f3 + f5)/f < 25.74 \text{ mm};$$

$$1.62 \text{ mm}^{-1} < (TL/IMH)/R2 < 2.75 \text{ mm}^{-1};$$

$$12.9 \text{ mm} < TL * SL/f < 21.33 \text{ mm}.$$

When the optical lens assembly satisfies the conditions of 702.32 mm*°<TL*(f*FOV)/CA1<1286.23 mm*°, in this way, the ratio of the height of the optical lens assembly to the image size is more suitable under large viewing angles, and it is beneficial to balance the image quality and the size of the optical lens assembly.

When the optical lens assembly satisfies the conditions of 26.85°<(CA1/CA12)*CRA<53.06°, in this way, a configuration of an outer diameter of the smaller lens of the optical lens assembly is more suitable for achieving miniaturization.

When the optical lens assembly satisfies the conditions of 34.51°<(IMH/CA12)*CRA<58.29°, in this way, a configuration of an outer diameter of the smaller lens of the optical lens assembly is more suitable for achieving miniaturization.

When the optical lens assembly satisfies the conditions of 51.3°<ATAN((BFL-TDP12)/(IMH−CA12))<85.83°, in this way, a configuration of an outer diameter of the smaller lens of the optical lens assembly is more suitable for achieving miniaturization.

When the optical lens assembly satisfies the conditions of $30.55<(IMH/CA1)*CRA<58.19°$, in this way, a configuration of an outer diameter of the smaller lens of the optical lens assembly is more suitable, thereby achieving the miniaturization of the optical lens assembly and meeting the effect of the ultra-wide-angle.

When the optical lens assembly satisfies the conditions of $12.42$ mm$<TL*CA1/EPD<26.15$ mm, in this way, the optical lens assembly has a larger amount of incident light and better image quality, and achieves an optimal balance of formability of the optical lens assembly to facilitate miniaturization.

When the optical lens assembly satisfies the conditions of $21.84$ mm$<TL*(FOV/CRA)<38.12$ mm, in this way, the ratio of the height of the optical lens assembly to the image size is more suitable under large viewing angles, and it is beneficial to balance the image quality and the size of the optical lens assembly.

When the optical lens assembly satisfies the conditions of $101.34°<(TL*CRA)/f<175.96°$, in this way, the optical lens assembly still maintains better image quality under a spatial configuration having a lower height of the optical lens assembly.

When the optical lens assembly satisfies the conditions of $6.85$ mm$<TL*(IMH/f)<11.55$ mm, in this way, the ratio of the height of the optical lens assembly to the image size is more suitable under large viewing angles, and it is beneficial to balance the image quality and the size of the optical lens assembly.

When the optical lens assembly satisfies the conditions of $1.65$ mm$<TL*EPD/IMH<2.76$ mm, in this way, the optical lens assembly has better image quality and incident light amount, and achieve an optimal balance in the height configuration of the optical lens assembly.

When the optical lens assembly satisfies the conditions of $1.33<(2*CA2)/R2<2.27$, in this way, the ratio of the height of the optical lens assembly to the image size is more suitable under large viewing angles, and it is beneficial to balance the image quality and the size of the optical lens assembly.

When the optical assembly satisfies the conditions of $2.12<(CA1/CA12)*(TL/IMH)<4.10$, in this way, a configuration of an outer diameter of the smaller lens of the optical lens assembly is more suitable for achieving miniaturization.

When the optical lens assembly satisfies the conditions of $12.72$ mm$<TL*(f3+f5)/f<25.74$ mm, in this way, the ratio of the height of the optical lens assembly to the image size is more suitable under large viewing angles, and it is beneficial to balance the image quality and the size of the optical lens assembly.

When the optical lens assembly satisfies the conditions of $1.62$ mm$^{-1}<(TL/IMH)/R2<2.75$ mm$^{-1}$, in this way, the optical lens assembly still maintains better image quality under a spatial configuration having a lower height of the optical lens assembly.

When the optical lens assembly satisfies the conditions of $12.9$ mm$<TL*SL/f<21.33$ mm, in this way, the optical lens assembly still maintains better image quality under a spatial configuration having a lower height of the optical lens assembly.

DETAILED DESCRIPTION

In order to enable a person of ordinary skill in the art to understand and realize the contents of the present disclosure, the following are illustrated by proper embodiments with accompanying drawings, and the equivalent substitutions and modifications based on the contents of the present disclosure are included in the scope of the present disclosure. It is also stated that the accompanying drawings of the present disclosure are not depictions of actual dimensions, and although the present disclosure provides embodiments of particular parameters, it is to be understood that the parameters need not be exactly equal to their corresponding values, and that, within an acceptable margin of error, are approximate to their corresponding parameters. The following embodiments will further detail the technical aspects of the present disclosure, but the disclosure is not intended to limit the scope of the present disclosure.

First Embodiment

Figure 1A:
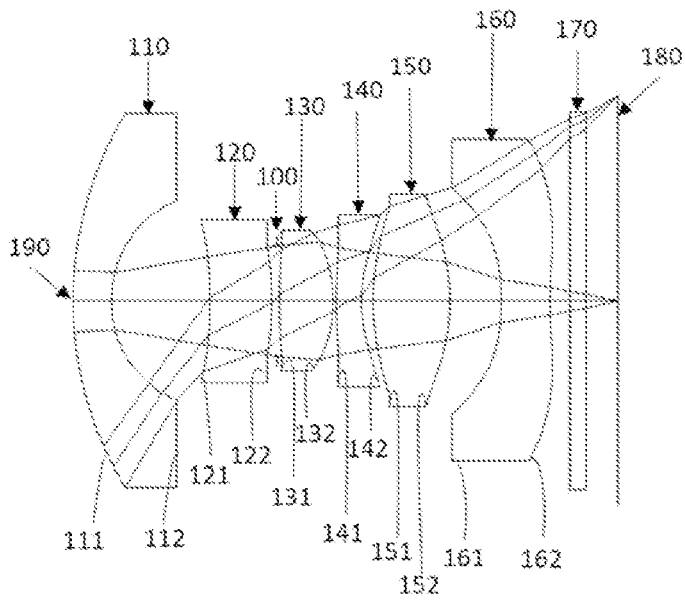
FIG. 1A is a schematic view of an optical lens assembly according to a first embodiment of the present disclosure.
Figure 1B:
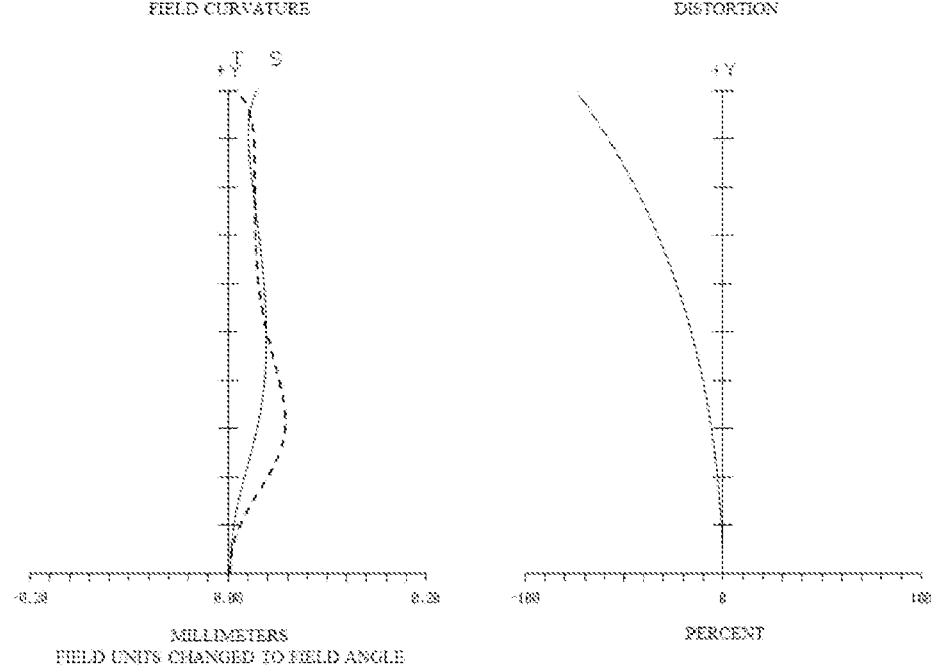
FIG. 1B sequentially shows a field curvature curve and a distortion curve of an optical lens assembly according to a first embodiment.

Refer to FIG. 1A and FIG. 1B. FIG. 1A is a schematic view of an optical lens assembly according to a first embodiment of the present disclosure, and FIG. 1B shows a field curvature curve and a distortion curve of an optical lens assembly according to a first embodiment. As can be seen from FIG. 1A, the optical lens assembly includes, in order from an object side to an image side: a first lens 110, a second lens 120, a stop 100, a third lens 130, a fourth lens 140, a fifth lens 150, a sixth lens 160, an IR-cut filter 170 and an image plane 180. A total quantity of lenses with refractive power in the optical lens assembly is six, but not limited thereto.

The first lens 110 with negative refractive power is made of a glass material and includes an object-side surface 111 and an image-side surface 112, wherein the object-side surface 111 of the first lens 110 is convex near an optical axis 190, and the image-side surface 112 of the first lens 110 is concave near the optical axis 190. The object-side surface 111 and the image-side surface 112 are spherical.

The second lens 120 with positive refractive power is made of a plastic material and includes an object-side surface 121 and an image-side surface 122, wherein the object-side surface 121 of the second lens 120 is concave near the optical axis 190, and the image-side surface 122 of the second lens 120 is convex near the optical axis 190. The object-side surface 121 and the image-side surface 122 are aspheric.

The third lens 130 with positive refractive power is made of a plastic material and includes an object-side surface 131 and an image-side surface 132, wherein the object-side surface 131 of the third lens 130 is convex near an optical axis 190, and the image-side surface 132 of the third lens 130 is convex near the optical axis 190. The object-side surface 131 and the image-side surface 132 are aspheric.

The fourth lens 140 with negative refractive power is made of a plastic material and includes an object-side surface 141 and an image-side surface 142, wherein the object-side surface 141 of the fourth lens 140 is convex near an optical axis 190, and the image-side surface 142 of the fourth lens 140 is concave near the optical axis 190. The object-side surface 141 and the image-side surface 142 are aspheric.

The fifth lens 150 with positive refractive power is made of a plastic material and includes an object-side surface 151 and an image-side surface 152, wherein the object-side surface 151 of the fifth lens 150 is convex near the optical axis 190, and the image-side surface 152 of the fifth lens 150 is convex near the optical axis 190. The object-side surface 151 and the image-side surface 152 are aspheric.

The sixth lens 160 with negative refractive power is made of a plastic material and includes an object-side surface 161 and an image-side surface 162, wherein the object-side surface 161 of the sixth lens 160 is concave near the optical axis 190, and the image-side surface 162 of the sixth lens 160 is concave near the optical axis 190. The object-side surface 161 and the image-side surface 162 are aspheric.

The IR-cut filter 170 is made of glass, and is disposed between the sixth lens 160 and the image plane 180 without affecting a focal length of the optical lens assembly. It can be understood that, the IR-cut filter 170 may also be formed on the surface of the above-mentioned lens. The IR-cut filter 170 may also be made of other materials.

An aspheric curve equation of the above-mentioned lenses is expressed as follows:

$$z(h) = \frac{ch^2}{1 + \left[1 - (k+1)c^2h^2\right]^{0.5}} + \sum (A_i) \cdot \left(h^i\right)$$

wherein, z is a position value in the direction of the optical axis 190 and with a surface vertex as a reference at a position of a height h; c is a curvature of a lens surface near the optical axis 190, and is a reciprocal of a curvature radius (R) (c=1/R), R is a curvature radius of a lens surface near the optical axis 190, h is a vertical distance between the lens surface and the optical axis 190, k is a conic constant, and Ai is an $i^{th}$ order aspheric coefficient.

In the first embodiment, a focal length of the optical lens assembly is f, an f-number of the optical lens assembly is Fno, and a maximum field of view in the optical lens assembly is FOV, and values are as follows: f=1.78 (millimeters), Fno=2.44, and FOV=158.30° (degrees).

In the optical lens assembly of the first embodiment, a distance from an object-side surface 111 of the first lens 110 to an image plane 180 along the optical axis 190 is TL, a focal length of the system is f, a maximum field of view of the optical lens assembly is FOV, a maximum optical effective radius of the object-side surface 111 of the first lens 110 is CA1, and the following condition is satisfied: TL* (f*FOV)/CA1=885.32 mm*°.

In the optical lens assembly of the first embodiment, a maximum optical effective radius of the image-side surface 162 of the sixth lens 160 is CA12, an incident angle where a chief ray is incident on an image plane at a maximum view angle of the optical lens assembly is CRA, and the following condition is satisfied: (CA1/CA12)*CRA=40.41°.

In the optical lens assembly of the first embodiment, a maximum image height of the optical lens assembly is IMH, a maximum optical effective radius of the image-side surface 162 of the sixth lens 160 is CA12, an incident angle where a chief ray is incident on an image plane at a maximum view angle of the optical lens assembly is CRA, and the following condition is satisfied: (IMH/CA12) *CRA=44.36°.

In the optical lens assembly of the first embodiment, a distance from the image-side surface 162 of the sixth lens 160 to the image plane 180 along the optical axis 190 is BFL, a distance in parallel with the optical axis 190 from an axial point on the image-side surface 162 of the sixth lens 160 to a maximum optical effective radius position of the image-side surface 162 of the sixth lens 160 is TDP12, a maximum image height of the optical lens assembly is IMH, a maximum optical effective radius of the image-side surface 162 of the sixth lens 160 is CA12, and the following condition is satisfied: ATAN((BFL−TDP12)/(IMH−CA12)) =65.25°.

In the optical lens assembly of the first embodiment, a maximum image height of the optical lens assembly is IMH, an incident angle where a chief ray is incident on an image plane at a maximum view angle of the optical lens assembly is CRA, and the following condition is satisfied: (IMH/CA1) *CRA=38.19.

In the optical lens assembly of the first embodiment, an entrance pupil diameter of the optical lens assembly is EPD, and the following condition is satisfied: TL*CA1/ EPD=21.30 mm.

In the optical lens assembly of the first embodiment, an incident angle where a chief ray is incident on an image plane at a maximum view angle of the optical lens assembly is CRA, and the following condition is satisfied: TL*(FOV/ CRA)=31.77 mm.

In the optical lens assembly of the first embodiment, the following condition is satisfied: (TL*CRA)/f=136.66°.

In the optical lens assembly of the first embodiment, a maximum image height of the optical lens assembly is IMH, and the following condition is satisfied: TL*(IMH/f)=9.56 mm.

In the optical lens assembly of the first embodiment, an entrance pupil diameter of the optical lens assembly is EPD, and the following condition is satisfied: TL*EPD/IMH=2.08 mm.

In the optical lens assembly of the first embodiment, a maximum optical effective radius of the image-side surface 112 of the first lens 110 is CA2, a curvature radius of the image-side surface 112 of the first lens 110 is R2, a maximum image height of the optical lens assembly is IMH, and the following condition is satisfied: (2*CA2)/R2=1.89.

In the optical lens assembly of the first embodiment, a maximum optical effective radius of the image-side surface 162 of the sixth lens 160 is CA12, a maximum image height of the optical lens assembly is IMH, and the following condition is satisfied: (CA1/CA12)*(TL/IMH)=3.33.

In the optical lens assembly of the first embodiment, a focal length of the third lens 130 is f3, a focal length of the fifth lens 150 is f5, and the following condition is satisfied: TL*(f3+f5)/f=21.04 mm.

In the optical lens assembly of the first embodiment, a maximum image height of the optical lens assembly is IMH, a curvature radius of the image-side surface 112 of the first lens 110 is R2, and the following condition is satisfied: (TL/IMH)/R2=2.29 mm$^{-1}$.

In the optical lens assembly of the first embodiment, a distance from the stop 100 to the image plane 180 along the optical axis 190 is SL, and the following condition is satisfied: TL*SL/f=17.11 mm.

Refer to Table 1 and Table 2 below.

TABLE 1

First embodiment
f (focal length) = 1.78 mm (millimeters), Fno (f-number) = 2.44,
FOV (field of view) = 158.30° (degrees)

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 500 | | | | |
| 1 | First lens | 3.960 | 0.501 | Glass | 1.80 | 46.50 | −2.47 |
| 2 | | 1.253 | 1.255 | | | | |
| 3 | Second lens | −8.289 (ASP) | 0.796 | Plastic | 1.64 | 23.97 | 7.21 |
| 4 | | −3.077 (ASP) | 0.071 | | | | |
| 5 | Stop | Infinity | 0.033 | | | | |
| 6 | Third lens | 8.301 (ASP) | 0.682 | Plastic | 1.54 | 55.99 | 2.98 |
| 7 | | −1.963 (ASP) | 0.035 | | | | |
| 8 | Fourth lens | 2.367 (ASP) | 0.331 | Plastic | 1.68 | 18.15 | −5.57 |
| 9 | | 1.380 (ASP) | 0.149 | | | | |
| 10 | Fifth lens | 2.490 (ASP) | 0.985 | Plastic | 1.54 | 55.99 | 2.38 |
| 11 | | −2.343 (ASP) | 0.651 | | | | |
| 12 | Sixth lens | −3.521 (ASP) | 0.619 | Plastic | 1.66 | 20.37 | −2.53 |
| 13 | | 3.463 (ASP) | 0.262 | | | | |
| 14 | IR-cut filter | Infinity | 0.210 | Glass | 1.52 | 64.17 | |
| 15 | | Infinity | 0.400 | | | | |
| 16 | Image Plane | Infinity | | | | | |

Reference wavelength 555 nm

TABLE 2

Aspheric coefficient

| Surface | 3 | 4 | 6 | 7 | 8 |
|---|---|---|---|---|---|
| K: | −1.2791E+01 | −7.9264E+00 | −4.7649E+01 | 2.6998E+00 | −9.7362E+01 |
| A2: | 0.0000E+00 | 0.0000E+00 | 0.0000E+00 | 0.0000E+00 | 0.0000E+00 |
| A4: | −1.0848E−01 | −1.0689E−01 | 1.4049E−01 | −7.4940E−01 | −7.3263E−02 |
| A6: | 1.0463E−01 | 1.5977E+00 | −3.2820E+00 | 5.3639E+00 | 5.7624E−01 |
| A8: | −4.1729E−01 | −1.6680E+01 | 4.1723E+01 | −2.6995E+01 | −4.0158E+00 |
| A10: | 1.3205E+00 | 1.0944E+02 | −3.0922E+02 | 9.1579E+01 | 1.4905E+01 |
| A12: | −2.4948E+00 | −4.4725E+02 | 1.4032E+03 | −2.0761E+02 | −3.5221E+01 |
| A14: | 2.9364E+00 | 1.1523E+03 | −3.9627E+03 | 3.0701E+02 | 5.3047E+01 |
| A16: | −2.0809E+00 | −1.8153E+03 | 6.7926E+03 | −2.8209E+02 | −4.8731E+01 |
| A18: | 8.1777E−01 | 1.5953E+03 | −6.4702E+03 | 1.4523E+02 | 2.4731E+01 |
| A20: | −1.4198E−01 | −5.9834E+02 | 2.6277E+03 | −3.1838E+01 | −5.2895E+00 |

| Surface | 9 | 10 | 11 | 12 | 13 |
|---|---|---|---|---|---|
| K: | −1.0160E+01 | −7.8500E+00 | −3.3653E+00 | −3.6960E+01 | −7.3359E+01 |
| A2: | 0.0000E+00 | 0.0000E+00 | 0.0000E+00 | 0.0000E+00 | 0.0000E+00 |
| A4: | 2.9223E−02 | −1.0083E−01 | −5.9051E−02 | −3.7959E−01 | −8.2561E−02 |
| A6: | 1.0844E−01 | 2.6873E−01 | 8.4814E−02 | 4.8312E−01 | 4.0899E−02 |
| A8: | −5.7295E−01 | −3.4903E−01 | −2.0922E−01 | −7.0830E−01 | −2.2472E−02 |
| A10: | 1.3812E+00 | 2.8815E−01 | 4.0436E−01 | 7.8396E−01 | 1.0132E−02 |
| A12: | −2.2761E+00 | −1.3913E−01 | −4.7963E−01 | −5.8091E−01 | −2.9787E−03 |
| A14: | 2.5858E+00 | 2.7208E−02 | 3.5909E−01 | 2.7601E−01 | 4.3310E−04 |
| A16: | −1.8755E+00 | 4.6199E−03 | −1.6156E−01 | −7.8871E−02 | 5.7921E−06 |
| A18: | 7.6881E−01 | −2.3096E−03 | 3.9585E−02 | 1.2126E−02 | −1.0068E−05 |
| A20: | −1.3487E−01 | −2.3559E−04 | −4.1379E−03 | −7.8885E−04 | 8.7450E−07 |

Table 1 shows detailed configuration data of the first embodiment in FIG. 1A. Units of the curvature radius, the central thickness, the gap, and the focal length is mm. Surfaces 0 to 16 sequentially represent surfaces from an object side to an image side. Surface 5 is a gap between the stop 100 and the object-side surface 131 of the third lens 130 along the optical axis 190. The stop 100 is closer to the object side than the object-side surface 131 of the third lens 130, and therefore the stop 100 is represented by a positive value. Otherwise, if the object-side surface 131 of the third lens 130 is closer to the object side than the stop 100, the stop 100 is represented by a negative value. Surfaces 1, 3, 6, 8, 10, 12 and 14 are respectively central thicknesses of the first lens 110, the second lens 120, the third lens 130, the fourth lens 140, the fifth lens 150, the sixth lens 160, and the IR-cut filter 170 along the optical axis 190. Surfaces 2, 4, 7, 9, 11, 13 and 15 respectively are a gap between the first lens 110 and the second lens 120 along the optical axis 190, a gap between the second lens 120 and the stop 100 along the optical axis 190, a gap between the third lens 130 and the fourth lens 140 along the optical axis 190, a gap between the fourth lens 140 and the fifth lens 150 along the optical axis 190, a gap between the fifth lens 150 and the sixth lens 160 along the optical axis 190, a gap between the sixth lens 160 and the IR-cut filter 170 along the optical axis 190, and a gap between the IR-cut filter 170 and the image plane 180 along the optical axis 190.

Table 2 shows aspheric data in the first embodiment. k represents a conic constant in an aspheric curve equation, and A2, A4, A6, A8, A10, A12, A14, A16, A18 and A20 are high-order aspheric coefficients. In addition, the following tables of embodiments are schematic diagrams and aberration curves corresponding to the embodiments. The definitions of data in the tables of the embodiments are the same as the definitions in Table 1 and Table 2 of the first embodiment, and are not repeated herein.

Second Embodiment

Figure 2A:
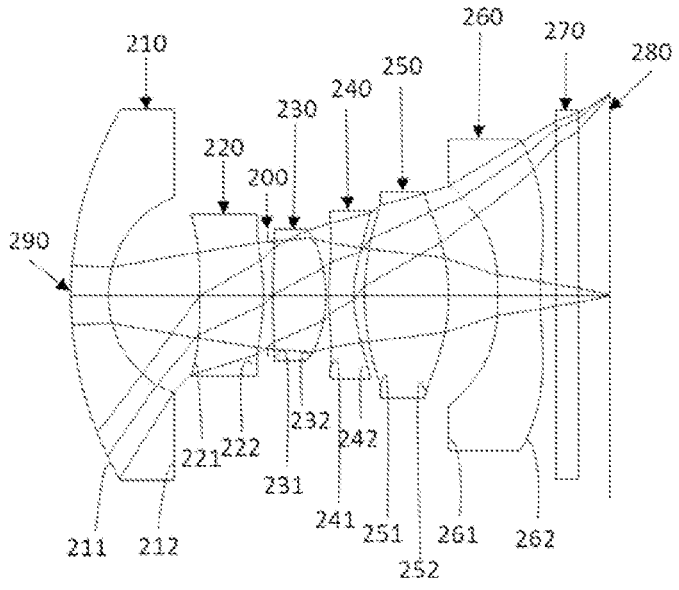
FIG. 2A is a schematic view of an optical lens assembly according to a second embodiment of the present disclosure.
Figure 2B:
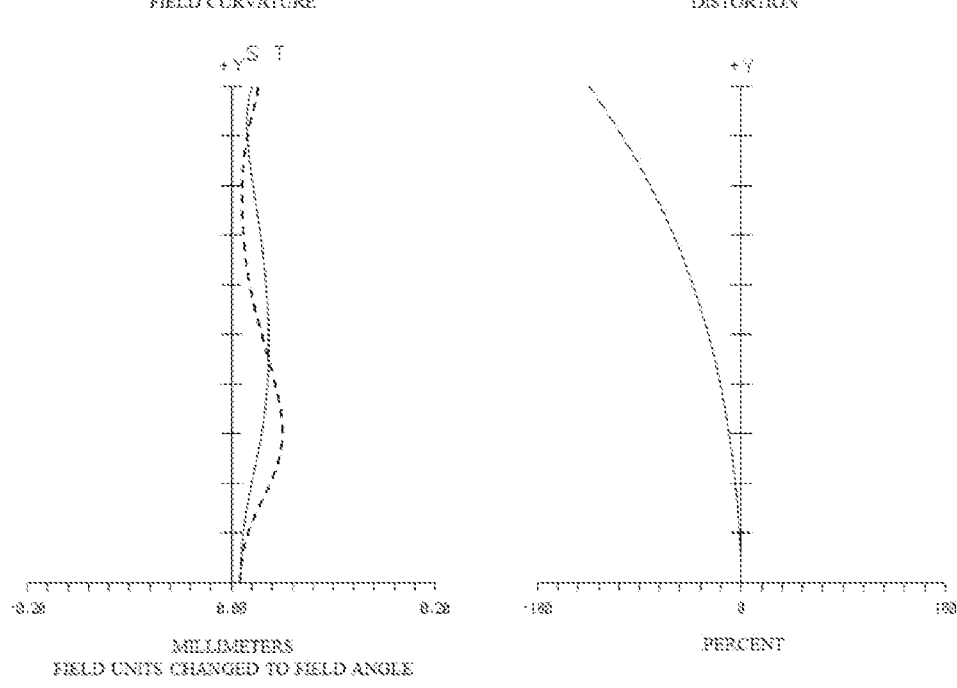
FIG. 2B sequentially shows a field curvature curve and a distortion curve of an optical lens assembly according to a second embodiment.

Refer to FIG. 2A and FIG. 2B. FIG. 2A is a schematic view of an optical lens assembly according to a second embodiment of the present disclosure, and FIG. 2B shows a field curvature curve and a distortion curve of an optical lens assembly according to a second embodiment. As can be seen from FIG. 2A, the optical lens assembly includes, in order from an object side to an image side: a first lens 210, a second lens 220, a stop 200, a third lens 230, a fourth lens 240, a fifth lens 250, a sixth lens 260, an IR-cut filter 270, and an image plane 280. A total quantity of lenses with refractive power in the optical lens assembly is six, but not limited thereto.

The first lens 210 with negative refractive power is made of a glass material and includes an object-side surface 211 and an image-side surface 212, wherein the object-side surface 211 of the first lens 210 is convex near an optical axis 290, and the image-side surface 212 of the first lens 210 is concave near the optical axis 290. The object-side surface 211 and the image-side surface 212 are spherical.

The second lens 220 with positive refractive power is made of a plastic material and includes an object-side surface 221 and an image-side surface 222, wherein the object-side surface 221 of the second lens 220 is concave near the optical axis 290, and the image-side surface 222 of the second lens 220 is convex near the optical axis 290. The object-side surface 221 and the image-side surface 222 are aspheric.

The third lens 230 with positive refractive power is made of a plastic material and includes an object-side surface 231 and an image-side surface 232, wherein the object-side surface 231 of the third lens 230 is convex near an optical axis 290, and the image-side surface 232 of the third lens 230 is convex near the optical axis 290. The object-side surface 231 and the image-side surface 232 are aspheric.

The fourth lens 240 with negative refractive power is made of a plastic material and includes an object-side surface 241 and an image-side surface 242, wherein the object-side surface 241 of the fourth lens 240 is convex near an optical axis 290, and the image-side surface 242 of the fourth lens 240 is concave near the optical axis 290. The object-side surface 241 and the image-side surface 242 are aspheric.

The fifth lens 250 with positive refractive power is made of a plastic material and includes an object-side surface 251 and an image-side surface 252, wherein the object-side surface 251 of the fifth lens 250 is convex near the optical axis 290, and the image-side surface 252 of the fifth lens 250 is convex near the optical axis 290. The object-side surface 251 and the image-side surface 252 are aspheric.

The sixth lens 260 with negative refractive power is made of a plastic material and includes an object-side surface 261 and an image-side surface 262, wherein the object-side surface 261 of the sixth lens 260 is concave near the optical axis 290, and the image-side surface 262 of the sixth lens 260 is concave near the optical axis 290. The object-side surface 261 and the image-side surface 262 are aspheric.

The IR-cut filter 270 is made of glass, and is disposed between the sixth lens 260 and the image plane 280 without affecting a focal length of the optical lens assembly. It can be understood that, the IR-cut filter 270 may also be formed on the surface of the above-mentioned lens. The IR-cut filter 270 may also be made of other materials.

Refer to Table 3 and Table 4 below.

TABLE 3

| Second embodiment |
| :---: |
| f (focal length) = 1.77 mm (millimeters), Fno (f-number) = 2.47, FOV (field of view) = 159.11° (degrees) |

| Surface | | Curvature radius (mm) | | Central thickness/gap (mm) | Material | Refractive index (nd) | Abbe number (vd) | Focal length (mm) |
|---|---|---|---|---|---|---|---|---|
| 0 | Object | Infinity | | 500 | | | | |
| 1 | First lens | 4.183 | | 0.500 | Glass | 1.80 | 46.50 | −2.39 |
| 2 | | 1.251 | | 1.176 | | | | |
| 3 | Second lens | −7.858 | (ASP) | 0.826 | Plastic | 1.64 | 23.97 | 6.39 |
| 4 | | −2.801 | (ASP) | 0.061 | | | | |
| 5 | Stop | Infinity | | 0.063 | | | | |
| 6 | Third lens | 10.645 | (ASP) | 0.680 | Plastic | 1.54 | 55.99 | 3.09 |

TABLE 3-continued

| | | | Central | | | Abbe | Focal |
| Surface | | Curvature radius (mm) | thickness/gap (mm) | Material | Refractive index (nd) | number (vd) | length (mm) |
|---|---|---|---|---|---|---|---|
| 7 | | −1.964 (ASP) | 0.040 | | | | |
| 8 | Fourth lens | 2.327 (ASP) | 0.330 | Plastic | 1.68 | 18.15 | −5.34 |
| 9 | | 1.342 (ASP) | 0.136 | | | | |
| 10 | Fifth lens | 2.325 (ASP) | 1.080 | Plastic | 1.54 | 55.99 | 2.33 |
| 11 | | −2.351 (ASP) | 0.646 | | | | |
| 12 | Sixth lens | −3.743 (ASP) | 0.555 | Plastic | 1.66 | 20.37 | −2.47 |
| 13 | | 3.127 (ASP) | 0.193 | | | | |
| 14 | IR-cut filter | Infinity | 0.300 | Glass | 1.52 | 64.17 | |
| 15 | | Infinity | 0.400 | | | | |
| 16 | Image Plane | Infinity | | | | | |

Reference wavelength 555 nm

Second embodiment
f (focal length) = 1.77 mm (millimeters), Fno (f-number) = 2.47,
FOV (field of view) = 159.11° (degrees)

TABLE 4

Aspheric coefficient

| Surface | 3 | 4 | 6 | 7 | 8 |
|---|---|---|---|---|---|
| K: | −3.2818E+01 | −8.2249E+00 | −3.1756E+01 | 2.6892E+00 | −9.3262E+01 |
| A2: | 0.0000E+00 | 0.0000E+00 | 0.0000E+00 | 0.0000E+00 | 0.0000E+00 |
| A4: | −1.0535E−01 | −1.0564E−01 | 1.4264E−01 | −7.4849E−01 | −7.6494E−02 |
| A6: | 1.0018E−01 | 1.6012E+00 | −3.2841E+00 | 5.3613E+00 | 5.7454E−01 |
| A8: | −4.1600E−01 | −1.6694E+01 | 4.1713E+01 | −2.6999E+01 | −4.0183E+00 |
| A10: | 1.3219E+00 | 1.0939E+02 | −3.0924E+02 | 9.1581E+01 | 1.4903E+01 |
| A12: | −2.4920E+00 | −4.4727E+02 | 1.4032E+03 | −2.0761E+02 | −3.5224E+01 |
| A14: | 2.9325E+00 | 1.1524E+03 | −3.9628E+03 | 3.0701E+02 | 5.3042E+01 |
| A16: | −2.0852E+00 | −1.8150E+03 | 6.7926E+03 | −2.8211E+02 | −4.8733E+01 |
| A18: | 8.1447E−01 | 1.5949E+03 | −6.4706E+03 | 1.4521E+02 | 2.4737E+01 |
| A20: | −1.3405E−01 | −5.9834E+02 | 2.6282E+03 | −3.1796E+01 | −5.2790E+00 |

| Surface | 9 | 10 | 11 | 12 | 13 |
|---|---|---|---|---|---|
| K: | −9.9623E+00 | −7.1044E+00 | −3.8271E+00 | −4.2460E+01 | −6.0962E+01 |
| A2: | 0.0000E+00 | 0.0000E+00 | 0.0000E+00 | 0.0000E+00 | 0.0000E+00 |
| A4: | 2.6779E−02 | −9.8558E−02 | −5.7523E−02 | −3.9168E−01 | −8.7448E−02 |
| A6: | 1.0544E−01 | 2.6839E−01 | 8.1363E−02 | 4.7802E−01 | 4.1227E−02 |
| A8: | −5.7580E−01 | −3.4959E−01 | −2.0993E−01 | −7.0831E−01 | −2.2480E−02 |
| A10: | 1.3792E+00 | 2.8807E−01 | 4.0468E−01 | 7.8366E−01 | 1.0155E−02 |
| A12: | −2.2759E+00 | −1.3878E−01 | −4.7925E−01 | −5.8086E−01 | −2.9812E−03 |
| A14: | 2.5846E+00 | 2.6867E−02 | 3.5924E−01 | 2.7605E−01 | 4.3537E−04 |
| A16: | −1.8757E+00 | 3.9240E−03 | −1.6154E−01 | −7.8817E−02 | 5.5143E−06 |
| A18: | 7.6945E−01 | −2.2632E−03 | 3.9652E−02 | 1.2176E−02 | −1.0151E−05 |
| A20: | −1.3415E−01 | 2.1949E−04 | −4.0844E−03 | −7.7868E−04 | 8.9100E−07 |

In the second embodiment, an aspheric curve equation is expressed as that in the first embodiment. In addition, definitions of parameters in the following tables are the same as those in the first embodiment, and are not repeated herein.

Referring to Table 3 and Table 4, the following data may be calculated:

| Second embodiment | | | | |
|---|---|---|---|---|
| (CA1/CA12)*CRA | 44.22° | TL*(f*FOV)/CA1 | 877.91 | mm*° |
| (IMH/CA12)*CRA | 48.14° | TL*(f3 + f5)/f | 21.45 | mm |
| ATAN ((BFL−TDP12)/ (IMH−CA1)) | 64.13° | (TL/IMH)/R2 | 2.29 | mm⁻¹ |
| (IMH/CA1)*CRA | 40.38° | TL*SL/f | 17.49 | mm |
| TL*(FOV/CRA) | 29.96 mm | TL*EPD/IMH | 2.06 | mm |
| TL*(IMH/f) | 9.63 mm | TL*CA1/EPD | 21.79 | mm |
| (2*CA2)/R2 | 1.89 | (CA1/CA12)* (TL/IMH) | 3.42 | |
| (TL*CRA)/f | 146.63° | | | |

Third Embodiment

Figure 3A:
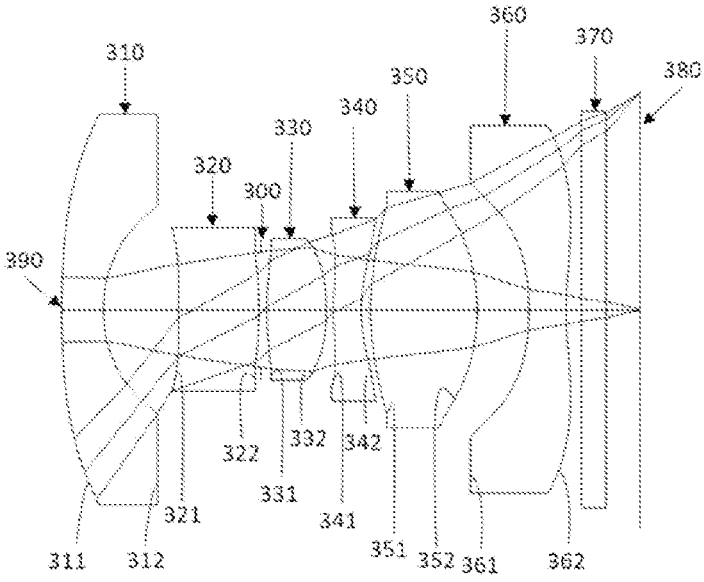
FIG. 3A is a schematic view of an optical lens assembly according to a third embodiment of the present disclosure of the present disclosure.
Figure 3B:
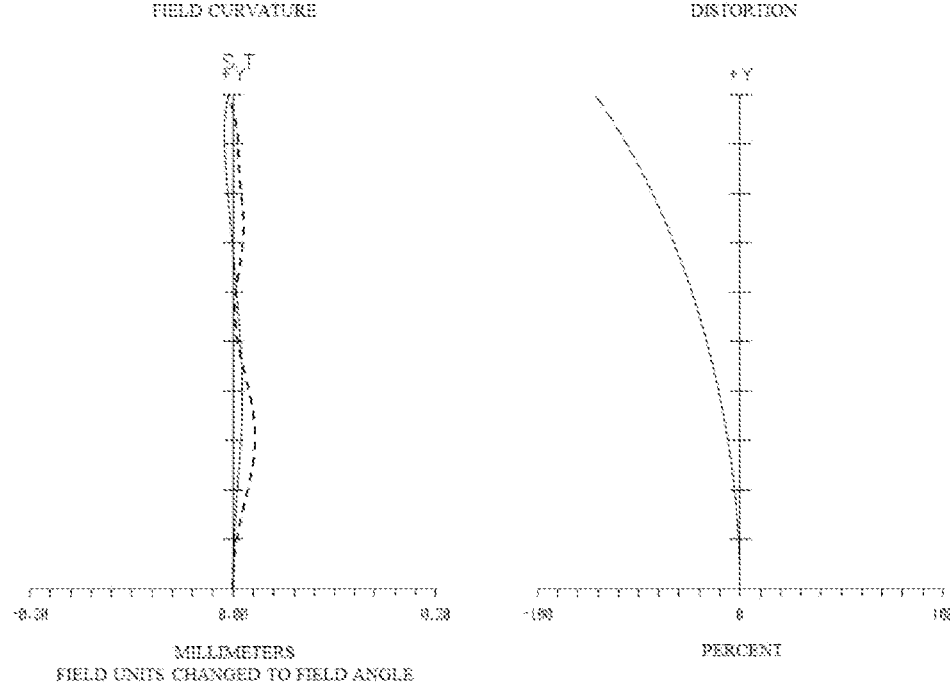
FIG. 3B shows a field curvature curves and a distortion curve of the optical lens assembly according to the third embodiment.

Refer to FIG. 3A and FIG. 3B. FIG. 3A is a schematic view of an optical lens assembly according to a third embodiment of the present disclosure, and FIG. 3B shows a field curvature curve and a distortion curve of an optical lens assembly according to a second embodiment. As can be seen from FIG. 3A, the optical lens assembly includes, in order from an object side to an image side: a first lens 310, a second lens 320, a stop 300, a third lens 330, a fourth lens 340, a fifth lens 350, a sixth lens 360, an IR-cut filter 370, and an image plane 380. A total quantity of lenses with refractive power in the optical lens assembly is six, but not limited thereto.

The first lens 310 with negative refractive power is made of a glass material and includes an object-side surface 311 and an image-side surface 312, wherein the object-side surface 311 of the first lens 310 is convex near an optical axis 390, and the image-side surface 312 of the first lens 310 is concave near the optical axis 390. The object-side surface 311 and the image-side surface 312 are aspheric.

The second lens 320 with positive refractive power is made of a plastic material and includes an object-side surface 321 and an image-side surface 322, wherein the object-side surface 321 of the second lens 320 is convex near the optical axis 390, and the image-side surface 322 of the second lens 320 is convex near the optical axis 390. The object-side surface 321 and the image-side surface 322 are aspheric.

The third lens 330 with positive refractive power is made of a plastic material and includes an object-side surface 331 and an image-side surface 332, wherein the object-side surface 331 of the third lens 330 is convex near an optical axis 390, and the image-side surface 332 of the third lens 330 is convex near the optical axis 390. The object-side surface 331 and the image-side surface 332 are aspheric.

The fourth lens 340 with negative refractive power is made of a plastic material and includes an object-side surface 341 and an image-side surface 342, wherein the object-side surface 341 of the fourth lens 340 is convex near an optical axis 390, and the image-side surface 342 of the fourth lens 340 is concave near the optical axis 390. The object-side surface 341 and the image-side surface 342 are aspheric.

The fifth lens 350 with positive refractive power is made of a plastic material and includes an object-side surface 351 and an image-side surface 352, wherein the object-side surface 351 of the fifth lens 350 is convex near the optical axis 390, and the image-side surface 352 of the fifth lens 350 is convex near the optical axis 390. The object-side surface 351 and the image-side surface 352 are aspheric.

The sixth lens 360 with negative refractive power is made of a plastic material and includes an object-side surface 361 and an image-side surface 362, wherein the object-side surface 361 of the sixth lens 360 is concave near the optical axis 390, and the image-side surface 362 of the sixth lens 360 is concave near the optical axis 390. The object-side surface 361 and the image-side surface 362 are aspheric.

The IR-cut filter 370 is made of glass, and is disposed between the sixth lens 360 and the image plane 380 without affecting a focal length of the optical lens assembly. It can be understood that, the IR-cut filter 370 may also be formed on the surface of the above-mentioned lens. The IR-cut filter 370 may also be made of other materials.

Refer to Table 5 and Table 6 below.

TABLE 5

Third embodiment
f (focal length) = 1.80 mm (millimeters), Fno (f-number) = 2.46,
FOV (field of view) = 155.91° (degrees)

| Surface | | Curvature radius (mm) | | Central thickness/gap (mm) | Material | Refractive index (nd) | Abbe number (vd) | Focal length (mm) |
|---|---|---|---|---|---|---|---|---|
| 0 | Object | Infinity | | 1000000 | | | | |
| 1 | First lens | 9.524 | (ASP) | 0.503 | Glass | 1.81 | 40.73 | −2.12 |
| 2 | | 1.417 | (ASP) | 0.908 | | | | |
| 3 | Second lens | 49.806 | (ASP) | 0.971 | Plastic | 1.64 | 23.97 | 8.17 |
| 4 | | −5.798 | (ASP) | 0.031 | | | | |
| 5 | Stop | Infinity | | 0.068 | | | | |
| 6 | Third lens | 3.933 | (ASP) | 0.720 | Plastic | 1.54 | 55.99 | 2.52 |
| 7 | | −1.977 | (ASP) | 0.085 | | | | |
| 8 | Fourth lens | 3.106 | (ASP) | 0.333 | Plastic | 1.68 | 18.15 | −4.21 |
| 9 | | 1.432 | (ASP) | 0.105 | | | | |
| 10 | Fifth lens | 2.001 | (ASP) | 1.295 | Plastic | 1.54 | 55.99 | 2.13 |
| 11 | | −2.147 | (ASP) | 0.623 | | | | |
| 12 | Sixth lens | −3.025 | (ASP) | 0.450 | Plastic | 1.66 | 20.37 | −2.39 |
| 13 | | 3.557 | (ASP) | 0.193 | | | | |
| 14 | IR-cut filter | Infinity | | 0.300 | Glass | 1.52 | 64.17 | |
| 15 | | Infinity | | 0.400 | | | | |
| 16 | Image Plane | Infinity | | | | | | |

Reference wavelength 555 nm

TABLE 6

Aspheric coefficient

| Surface | 1 | 2 | 3 | 4 | 6 | 7 |
|---|---|---|---|---|---|---|
| K | 8.7709E+00 | −7.2114E−01 | −1.7831E+01 | 2.7576E+01 | −2.9943E+01 | 1.4566E+00 |
| A2: | 0.0000E+00 | 0.0000E+00 | 0.0000E+00 | 0.0000E+00 | 0.0000E+00 | 0.0000E+00 |
| A4: | 6.7233E−03 | 4.4491E−02 | −1.2566E−01 | −1.1661E−01 | 1.9147E−02 | −1.5540E−02 |
| A6: | 2.5316E−03 | 3.0691E−02 | 7.2982E−02 | 5.2786E−01 | −6.5776E−01 | −4.6693E−01 |
| A8: | −1.1662E−03 | −2.5914E−02 | −6.9231E−01 | −6.8840E+00 | 5.3554E+00 | −1.5213E+00 |
| A10: | 1.8270E−04 | 5.0950E−02 | 3.0223E+00 | 5.9492E+01 | −2.8558E+01 | 1.6310E+01 |
| A12: | −1.0317E−05 | −2.8205E−02 | −8.6241E+00 | −2.9455E+02 | 9.8636E+01 | −5.9195E+01 |
| A14: | 0.0000E+00 | 0.0000E+00 | 1.5768E+01 | 8.8340E+02 | −2.1660E+02 | 1.1998E+02 |
| A16: | 0.0000E+00 | 0.0000E+00 | −1.7329E+01 | −1.5785E+03 | 2.9109E+02 | −1.4285E+02 |
| A18: | 0.0000E+00 | 0.0000E+00 | 1.0431E+01 | 1.5458E+03 | −2.1849E+02 | 9.3406E+01 |
| A20: | 0.0000E+00 | 0.0000E+00 | −2.6430E+00 | −6.3705E+02 | 7.0605E+01 | −2.5957E+01 |

TABLE 6-continued

| | | | Aspheric coefficient | | | |
|---|---|---|---|---|---|---|
| Surface | 8 | 9 | 10 | 11 | 12 | 13 |
| K: | −1.2266E+02 | −1.1962E+01 | −9.6590E+00 | −1.7261E−01 | −3.1932E+01 | −1.9993E+01 |
| A2: | 0.0000E+00 | 0.0000E+00 | 0.0000E+00 | 0.0000E+00 | 0.0000E+00 | 0.0000E+00 |
| A4: | 2.9088E−01 | 4.2993E−02 | −2.2149E−01 | −3.2342E−02 | −2.8785E−01 | −8.8820E−02 |
| A6: | −2.2079E+00 | 1.6106E−01 | 6.9639E−01 | 4.1911E−02 | 2.8323E−01 | 6.2229E−02 |
| A8: | 6.2204E+00 | −1.7868E+00 | −1.3811E+00 | −1.9610E−01 | −4.1828E−01 | −5.5151E−02 |
| A10: | −1.2780E+01 | 5.6054E+00 | 1.9375E+00 | 4.8337E−01 | 4.8436E−01 | 4.0676E−02 |
| A12: | 1.6544E+01 | −1.0117E+01 | −1.9008E+00 | −6.6785E−01 | −3.5692E−01 | −2.0298E−02 |
| A14: | −8.4771E+00 | 1.1652E+01 | 1.2749E+00 | 5.6260E−01 | 1.5341E−01 | 6.4389E−03 |
| A16: | −7.3329E+00 | −8.4537E+00 | −5.5166E−01 | −2.8734E−01 | −3.4015E−02 | −1.2465E−03 |
| A18: | 1.2671E+01 | 3.5186E+00 | 1.3751E−01 | 8.2425E−02 | 2.7958E−03 | 1.3465E−04 |
| A20: | −5.1699E+00 | −6.3956E−01 | −1.4904E−02 | −1.0133E−02 | 5.6777E−05 | −6.2406E−06 |

In the third embodiment, an aspheric curve equation is expressed as that in the first embodiment. In addition, definitions of parameters in the following tables are the same as those in the first embodiment, and are not repeated herein.

Referring to Table 5 and Table 6, the following data may be calculated:

| Third embodiment | | | |
|---|---|---|---|
| (CA1/CA12)*CRA | 38.97° | TL*(f*FOV)/CA1 | 888.83 mm*° |
| (IMH/CA12)*CRA | 43.13° | TL*(f3 + f5)/f | 18.07 mm |
| ATAN ((BFL-TDP12)/ (IMH-CA12)) | 71.53° | (TL/IMH)/R2 | 2.02 mm⁻¹ |
| (IMH/CA1)*CRA | 40.44° | TL*SL/f | 17.77 mm |
| TL*(FOV/CRA) | 29.8 mm | TL*EPD/IMH | 2.09 mm |
| TL*(IMH/f) | 9.47 mm | TL*CA1/EPD | 21.04 mm |
| (2*CA2)/R2 | 1.68 | (CA1/CA12)* (TL/IMH) | 3.06 |
| (TL*CRA)/f | 142.07° | | |

Fourth Embodiment

Figure 4A:
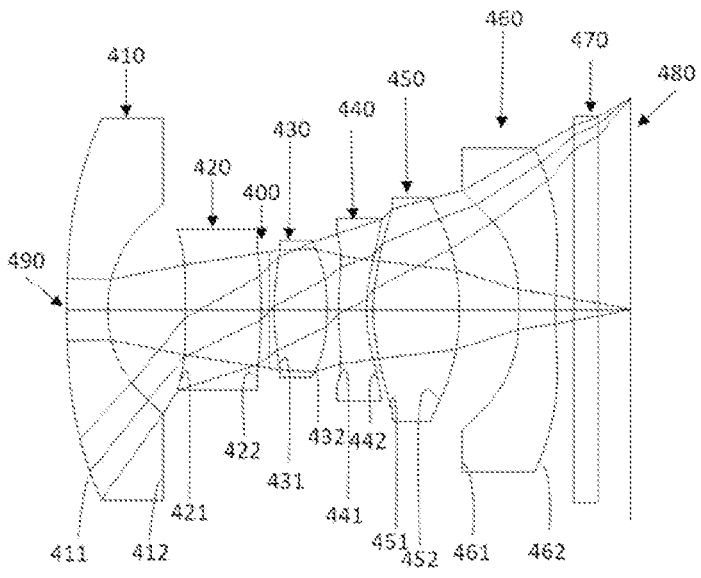
FIG. 4A is a schematic view of an optical lens assembly according to a fourth embodiment of the present disclosure of the present disclosure.
Figure 4B:
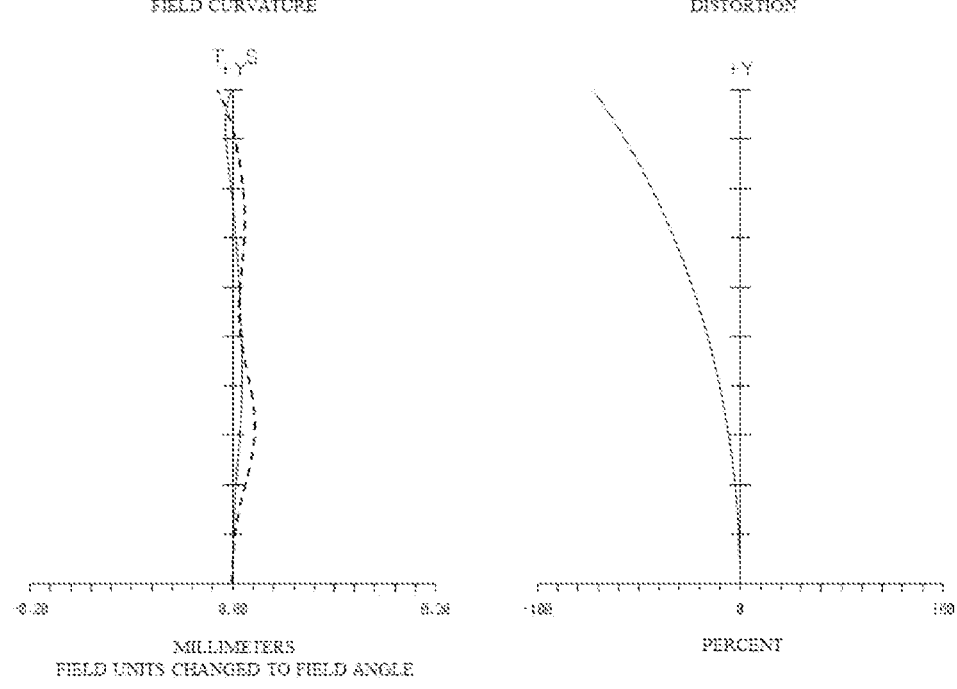
FIG. 4B shows a field curvature curves and a distortion curve of the optical lens assembly according to the fourth embodiment.

Refer to FIG. 4A and FIG. 4B. FIG. 4A is a schematic view of an optical lens assembly according to a fourth embodiment of the present disclosure, and FIG. 4B shows a field curvature curve and a distortion curve of an optical lens assembly according to a second embodiment. As can be seen from FIG. 4A, the optical lens assembly includes, in order from an object side to an image side: a first lens 410, a second lens 420, a stop 400, a third lens 430, a fourth lens 440, a fifth lens 450, a sixth lens 460, an IR-cut filter 470, and an image plane 480. A total quantity of lenses with refractive power in the optical lens assembly is six, but not limited thereto.

The first lens 410 with negative refractive power is made of a glass material and includes an object-side surface 411 and an image-side surface 412, wherein the object-side surface 411 of the first lens 410 is convex near an optical axis 490, and the image-side surface 412 of the first lens 410 is concave near the optical axis 490. The object-side surface 411 and the image-side surface 412 are aspheric.

The second lens 420 with positive refractive power is made of a plastic material and includes an object-side surface 421 and an image-side surface 422, wherein the object-side surface 421 of the second lens 420 is convex near the optical axis 490, and the image-side surface 422 of the second lens 420 is convex near the optical axis 490. The object-side surface 421 and the image-side surface 422 are aspheric.

The third lens 430 with positive refractive power is made of a plastic material and includes an object-side surface 431 and an image-side surface 432, wherein the object-side surface 431 of the third lens 430 is convex near an optical axis 490, and the image-side surface 432 of the third lens 430 is convex near the optical axis 490. The object-side surface 431 and the image-side surface 432 are aspheric.

The fourth lens 440 with negative refractive power is made of a plastic material and includes an object-side surface 441 and an image-side surface 442, wherein the object-side surface 441 of the fourth lens 440 is convex near an optical axis 490, and the image-side surface 442 of the fourth lens 440 is concave near the optical axis 490. The object-side surface 441 and the image-side surface 442 are aspheric.

The fifth lens 450 with positive refractive power is made of a plastic material and includes an object-side surface 451 and an image-side surface 452, wherein the object-side surface 451 of the fifth lens 450 is convex near the optical axis 490, and the image-side surface 452 of the fifth lens 450 is convex near the optical axis 490. The object-side surface 451 and the image-side surface 452 are aspheric.

The sixth lens 460 with negative refractive power is made of a plastic material and includes an object-side surface 461 and an image-side surface 462, wherein the object-side surface 461 of the sixth lens 460 is concave near the optical axis 490, and the image-side surface 462 of the sixth lens 460 is concave near the optical axis 490. The object-side surface 461 and the image-side surface 462 are aspheric.

The IR-cut filter 470 is made of glass, and is disposed between the sixth lens 460 and the image plane 480 without affecting a focal length of the optical lens assembly. It can be understood that, the IR-cut filter 470 may also be formed on the surface of the above-mentioned lens. The IR-cut filter 470 may also be made of other materials.

Refer to Table 7 and Table 8 below.

TABLE 7

Fourth embodiment
f (focal length) = 1.78 mm (millimeters), Fno (f-number) = 2.48,
FOV (field of view) = 157.16° (degrees)

| Surface | | Curvature radius (mm) | | Central thickness/gap (mm) | Material | Refractive index (nd) | Abbe number (vd) | Focal length (mm) |
|---|---|---|---|---|---|---|---|---|
| 0 | Object | Infinity | | 10000000 | | | | |
| 1 | First lens | 8.705 | (ASP) | 0.503 | Glass | 1.81 | 40.73 | −2.06 |
| 2 | | 1.364 | (ASP) | 0.962 | | | | |
| 3 | Second lens | 284.870 | (ASP) | 0.941 | Plastic | 1.64 | 23.97 | 9.71 |
| 4 | | −6.345 | (ASP) | 0.097 | | | | |
| 5 | Stop | Infinity | | 0.069 | | | | |
| 6 | Third lens | 3.284 | (ASP) | 0.653 | Plastic | 1.54 | 55.99 | 2.50 |
| 7 | | −2.170 | (ASP) | 0.144 | | | | |
| 8 | Fourth lens | 3.353 | (ASP) | 0.333 | Plastic | 1.68 | 18.15 | −3.57 |
| 9 | | 1.360 | (ASP) | 0.088 | | | | |
| 10 | Fifth lens | 1.620 | (ASP) | 1.074 | Plastic | 1.54 | 55.99 | 2.04 |
| 11 | | −2.716 | (ASP) | 0.735 | | | | |
| 12 | Sixth lens | −3.042 | (ASP) | 0.450 | Plastic | 1.66 | 20.37 | −2.80 |
| 13 | | 5.107 | (ASP) | 0.236 | | | | |
| 14 | IR-cut filter | Infinity | | 0.300 | Glass | 1.52 | 64.17 | |
| 15 | | Infinity | | 0.400 | | | | |
| 16 | Image Plane | Infinity | | | | | | |

Reference wavelength 555 nm

TABLE 8

Aspheric coefficient

| Surface | 1 | 2 | 3 | 4 | 6 | 7 |
|---|---|---|---|---|---|---|
| K: | 7.3207E+00 | −7.6382E−01 | 2.0000E+02 | 2.9642E+01 | −1.6463E+01 | 8.4706E−01 |
| A2: | 0.0000E+00 | 0.0000E+00 | 0.0000E+00 | 0.0000E+00 | 0.0000E+00 | 0.0000E+00 |
| A4: | 6.1048E−03 | 4.4613E−02 | −1.4412E−01 | −8.0654E−02 | 6.3428E−02 | −2.8076E−02 |
| A6: | 1.4745E−03 | 3.0059E−02 | 3.5584E−01 | 3.7323E−02 | −1.1195E+00 | −3.0577E−01 |
| A8: | −9.1770E−04 | −2.1441E−02 | −2.9089E+00 | 9.0296E−01 | 1.1578E+01 | −1.8730E−01 |
| A10: | 1.5910E−04 | 3.8491E−02 | 1.3168E+01 | −1.1212E+01 | −7.9329E+01 | 8.2933E+00 |
| A12: | −9.6369E−06 | −2.2546E−02 | −3.6970E+01 | 7.1757E+01 | 3.4774E+02 | −3.1420E+01 |
| A14: | 0.0000E+00 | 0.0000E+00 | 6.4517E+01 | −2.4734E+02 | −9.6373E+02 | 7.0217E+01 |
| A16: | 0.0000E+00 | 0.0000E+00 | −6.7672E+01 | 4.7826E+02 | 1.6304E+03 | −9.4784E+01 |
| A18: | 0.0000E+00 | 0.0000E+00 | 3.9036E+01 | −4.8865E+02 | −1.5334E+03 | 7.1153E+01 |
| A20: | 0.0000E+00 | 0.0000E+00 | −9.5100E+00 | 2.0594E+02 | 6.1351E+02 | −2.2732E+01 |

| Surface | 8 | 9 | 10 | 11 | 12 | 13 |
|---|---|---|---|---|---|---|
| K: | −1.2733E+02 | −1.2252E+01 | −8.8747E+00 | 9.6637E−02 | −3.0556E+01 | −4.5105E+01 |
| A2: | 0.0000E+00 | 0.0000E+00 | 0.0000E+00 | 0.0000E+00 | 0.0000E+00 | 0.0000E+00 |
| A4: | 2.0802E−01 | 1.4268E−02 | −2.4215E−01 | −3.6981E−02 | −2.7245E−01 | −7.3735E−02 |
| A6: | −1.5875E+00 | 2.2516E−01 | 8.5653E−01 | −5.6333E−03 | 1.3038E−01 | −1.0241E−02 |
| A8: | 5.1217E+00 | −1.3433E+00 | −1.8430E+00 | −6.8764E−02 | −1.4043E−01 | 4.2896E−02 |
| A10: | −1.5035E+01 | 3.1659E+00 | 2.7461E+00 | 2.9904E−01 | 1.7357E−01 | −3.8898E−02 |
| A12: | 3.3791E+01 | −4.4085E+00 | −2.7974E+00 | −5.1335E−01 | −1.6311E−01 | 2.0849E−02 |
| A14: | −5.2099E+01 | 3.9914E+00 | 1.8931E+00 | 4.9362E−01 | 1.0899E−01 | −6.9917E−03 |
| A16: | 5.1474E+01 | −2.3763E+00 | −8.0936E−01 | −2.7119E−01 | −4.5046E−02 | 1.4360E−03 |
| A18: | −2.9168E+01 | 8.7027E−01 | 1.9755E−01 | 7.9618E−02 | 9.9951E−03 | −1.6584E−04 |
| A20: | 7.1713E+00 | −1.5083E−01 | −2.0989E−02 | −9.6625E−03 | −9.0192E−04 | 8.2480E−06 |

In the fourth embodiment, an aspheric curve equation is expressed as that in the first embodiment. In addition, definitions of parameters in the following tables are the same as those in the first embodiment, and are not repeated herein.

Referring to Table 7 and Table 8, the following data may be calculated:

Fourth embodiment

| | | | |
|---|---|---|---|
| (CA1/CA12)*CRA | 43.76° | TL*(f*FOV)/CA1 | 891.10 mm*° |
| (IMH/CA12)*CRA | 48.58° | TL*(f3 + f5)/f | 17.77 mm |
| ATAN | 64.14 | (TL/IMH)/R2 | 2.1 mm⁻¹ |

-continued

Fourth embodiment

| | | | |
|---|---|---|---|
| ((BFL-TDP12)/ (IMH-CA12)) | | | |
| (IMH/CA1)*CRA | 41.13° | TL*SL/f | 17.57 mm |
| TL*(FOV/CRA) | 29.62 mm | TL*EPD/IMH | 2.06 mm |
| TL*(IMH/f) | 9.55 mm | TL*CA1/EPD | 21.33 mm |
| (2*CA2)/R2 | 1.77 | (CA1/CA12)* | 3.39 |
| (TL*CRA)/f | 145.26° | (TL/IMH) | |

Fifth Embodiment

Figure 5A:
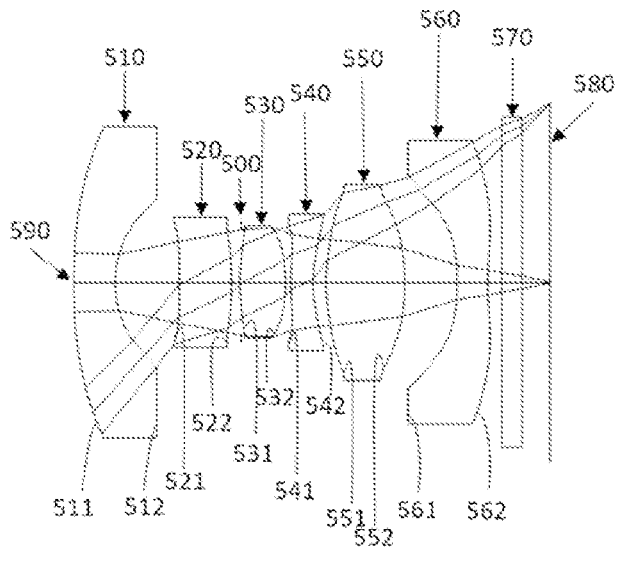
FIG. 5A is a schematic view of an optical lens assembly according to a fifth embodiment of the present disclosure of the present disclosure.
Figure 5B:
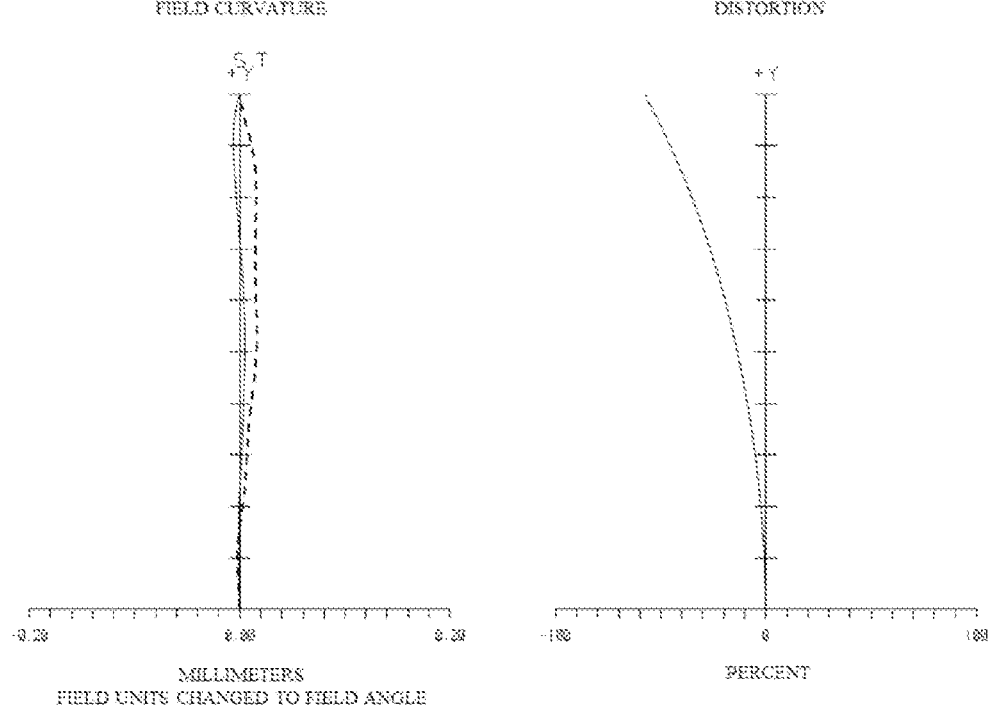
FIG. 5B shows a field curvature curves and a distortion curve of the optical lens assembly according to the fifth embodiment.

Refer to FIG. 5A and FIG. 5B. FIG. 5A is a schematic view of an optical lens assembly according to a fifth embodiment of the present disclosure, and FIG. 5B shows a field curvature curve and a distortion curve of an optical lens assembly according to a second embodiment. As can be seen from FIG. 5A, the optical lens assembly includes, in order from an object side to an image side: a first lens 510, a second lens 520, a stop 500, a third lens 530, a fourth lens 540, a fifth lens 550, a sixth lens 560, an IR-cut filter 570, and an image plane 580. A total quantity of lenses with refractive power in the optical lens assembly is six, but not limited thereto.

The first lens 510 with negative refractive power is made of a glass material and includes an object-side surface 511 and an image-side surface 512, wherein the object-side surface 511 of the first lens 510 is convex near an optical axis 590, and the image-side surface 512 of the first lens 510 is concave near the optical axis 590. The object-side surface 511 and the image-side surface 512 are aspheric.

The second lens 520 with positive refractive power is made of a plastic material and includes an object-side surface 521 and an image-side surface 522, wherein the object-side surface 521 of the second lens 520 is convex near the optical axis 590, and the image-side surface 522 of the second lens 520 is convex near the optical axis 590. The object-side surface 521 and the image-side surface 522 are aspheric.

The third lens 530 with positive refractive power is made of a plastic material and includes an object-side surface 531 and an image-side surface 532, wherein the object-side surface 531 of the third lens 530 is convex near an optical axis 590, and the image-side surface 532 of the third lens 530 is convex near the optical axis 590. The object-side surface 531 and the image-side surface 532 are aspheric.

The fourth lens 540 with negative refractive power is made of a plastic material and includes an object-side surface 541 and an image-side surface 542, wherein the object-side surface 541 of the fourth lens 540 is convex near an optical axis 590, and the image-side surface 542 of the fourth lens 540 is concave near the optical axis 590. The object-side surface 541 and the image-side surface 542 are aspheric.

The fifth lens 550 with positive refractive power is made of a plastic material and includes an object-side surface 551 and an image-side surface 552, wherein the object-side surface 551 of the fifth lens 550 is convex near the optical axis 590, and the image-side surface 552 of the fifth lens 550 is convex near the optical axis 590. The object-side surface 551 and the image-side surface 552 are aspheric.

The sixth lens 560 with negative refractive power is made of a plastic material and includes an object-side surface 561 and an image-side surface 562, wherein the object-side surface 561 of the sixth lens 560 is concave near the optical axis 590, and the image-side surface 562 of the sixth lens 560 is concave near the optical axis 590. The object-side surface 561 and the image-side surface 562 are aspheric.

The IR-cut filter 570 is made of glass, and is disposed between the sixth lens 560 and the image plane 580 without affecting a focal length of the optical lens assembly. It can be understood that, the IR-cut filter 570 may also be formed on the surface of the above-mentioned lens. The IR-cut filter 570 may also be made of other materials.

Refer to Table 9 and Table 10 below.

TABLE 9

|  |  |  |  | Central |  |  | Abbe | Focal |
| Surface |  | Curvature radius (mm) |  | thickness/gap (mm) | Material | Refractive index (nd) | number (vd) | length (mm) |
| --- | --- | --- | --- | --- | --- | --- | --- | --- |
|  |  | Fifth embodiment f (focal length) = 1.97 mm (millimeters), Fno (f-number) = 2.46, FOV (field of view) = 142.17° (degrees) |  |  |  |  |  |  |
| 0 | Object | Infinity |  | 1000000 |  |  |  |  |
| 1 | First lens | 7.746 | (ASP) | 0.616 | Glass | 1.81 | 40.73 | −2.16 |
| 2 |  | 1.374 | (ASP) | 0.931 |  |  |  |  |
| 3 | Second lens | 131.572 | (ASP) | 0.775 | Plastic | 1.64 | 23.97 | 9.07 |
| 4 |  | −6.058 | (ASP) | 0.134 |  |  |  |  |
| 5 | Stop | Infinity |  | −0.011 |  |  |  |  |
| 6 | Third lens | 3.199 | (ASP) | 0.669 | Plastic | 1.54 | 55.99 | 2.32 |
| 7 |  | −1.948 | (ASP) | 0.073 |  |  |  |  |
| 8 | Fourth lens | 4.262 | (ASP) | 0.332 | Plastic | 1.67 | 19.24 | −4.17 |
| 9 |  | 1.645 | (ASP) | 0.196 |  |  |  |  |
| 10 | Fifth lens | 2.148 | (ASP) | 1.159 | Plastic | 1.54 | 55.99 | 2.42 |
| 11 |  | −2.774 | (ASP) | 0.756 |  |  |  |  |
| 12 | Sixth lens | −3.902 | (ASP) | 0.450 | Plastic | 1.66 | 20.37 | −2.56 |
| 13 |  | 3.168 | (ASP) | 0.215 |  |  |  |  |
| 14 | IR-cut filter | Infinity |  | 0.300 | Glass | 1.52 | 64.17 |  |
| 15 |  | Infinity |  | 0.400 |  |  |  |  |
| 16 | Image Plane | Infinity |  |  |  |  |  |  |

Reference wavelength 555 nm

TABLE 10

| | | | Aspheric coefficient | | | |
|---|---|---|---|---|---|---|
| Surface | 1 | 2 | 3 | 4 | 6 | 7 |
| K: | 6.9771E+00 | −8.2527E−01 | −1.1822E+02 | 4.7322E+01 | −1.2177E+01 | −3.1327E−01 |
| A2: | 0.0000E+00 | 0.0000E+00 | 0.0000E+00 | 0.0000E+00 | 0.0000E+00 | 0.0000E+00 |
| A4: | 1.0307E−02 | 6.6708E−02 | −1.3834E−01 | −5.5217E−02 | 7.2808E−02 | 5.2181E−02 |
| A6: | −5.6251E−04 | 3.0455E−02 | −1.0398E−01 | −8.9076E−01 | −1.0244E+00 | −5.7234E−01 |
| A8: | −7.4402E−04 | −1.8078E−02 | 5.8958E−01 | 9.5370E+00 | 7.8635E+00 | −2.6360E+00 |
| A10: | 2.0540E−04 | 2.4164E−02 | −3.3696E+00 | −6.0513E+01 | −4.0549E+01 | 2.7535E+01 |
| A12: | −1.7877E−05 | −2.0891E−02 | 9.9065E+00 | 2.5007E+02 | 1.3573E+02 | −1.1480E+02 |
| A14: | 0.0000E+00 | 0.0000E+00 | −1.6345E+01 | −6.4960E+02 | −2.8618E+02 | 2.8091E+02 |
| A16: | 0.0000E+00 | 0.0000E+00 | 1.5802E+01 | 1.0262E+03 | 3.6677E+02 | −4.1209E+02 |
| A18: | 0.0000E+00 | 0.0000E+00 | −8.2724E+00 | −8.9996E+02 | −2.6036E+02 | 3.3422E+02 |
| A20: | 0.0000E+00 | 0.0000E+00 | 1.7867E+00 | 3.3732E+02 | 7.8643E+01 | −1.1489E+02 |
| A22: | 0.0000E+00 | 0.0000E+00 | 2.0323E−04 | 3.4383E−03 | −1.1209E−03 | −4.5774E−03 |
| A24: | 0.0000E+00 | 0.0000E+00 | 9.9328E−05 | 5.2017E−03 | −1.8379E−02 | −7.7538E−03 |
| A26: | 0.0000E+00 | 0.0000E+00 | 0.0000E+00 | 0.0000E+00 | 0.0000E+00 | 0.0000E+00 |
| A28: | 0.0000E+00 | 0.0000E+00 | 0.0000E+00 | 0.0000E+00 | 0.0000E+00 | 0.0000E+00 |
| A30: | 0.0000E+00 | 0.0000E+00 | 0.0000E+00 | 0.0000E+00 | 0.0000E+00 | 0.0000E+00 |

| Surface | 8 | 9 | 10 | 11 | 12 | 13 |
|---|---|---|---|---|---|---|
| K: | −1.7063E+02 | −1.3125E+01 | −8.0578E+00 | 1.0081E+00 | −9.9900E+01 | −4.4653E+01 |
| A2: | 0.0000E+00 | 0.0000E+00 | 0.0000E+00 | 0.0000E+00 | 0.0000E+00 | 0.0000E+00 |
| A4: | 1.2958E−01 | −2.0274E−02 | −1.6717E−01 | −4.4042E−02 | −4.6630E−01 | −1.0937E−01 |
| A6: | −1.2929E+00 | 3.5778E−01 | 4.3432E−01 | −7.7503E−03 | 6.6447E−01 | 5.3243E−02 |
| A8: | 3.2836E+00 | −1.7610E+00 | −7.6830E−01 | 7.5212E−02 | −1.1310E+00 | −2.1218E−02 |
| A10: | −8.1347E+00 | 4.0720E+00 | 1.0024E+00 | −1.9087E−01 | 1.5208E+00 | 1.1224E−02 |
| A12: | 1.8291E+01 | −4.7979E+00 | −8.5255E−01 | 3.2021E−01 | −1.4042E+00 | −7.1622E−03 |
| A14: | −2.8312E+01 | 2.2147E+00 | 4.4774E−01 | −3.3636E−01 | 8.4487E−01 | 3.1955E−03 |
| A16: | 2.4444E+01 | 8.6584E−01 | −1.3601E−01 | 2.1521E−01 | −3.1135E−01 | −8.1633E−04 |
| A18: | −8.4490E+00 | −1.3288E+00 | 2.0840E−02 | −7.4719E−02 | 6.3186E−02 | 1.0791E−04 |
| A20: | −3.3291E−01 | 3.9684E−01 | −1.0902E−03 | 1.0705E−02 | −5.3771E−03 | −5.7492E−06 |
| A22: | 0.0000E+00 | 0.0000E+00 | 0.0000E+00 | 0.0000E+00 | 0.0000E+00 | 0.0000E+00 |
| A24: | 0.0000E+00 | 0.0000E+00 | 0.0000E+00 | 0.0000E+00 | 0.0000E+00 | 0.0000E+00 |
| A26: | 0.0000E+00 | 0.0000E+00 | 0.0000E+00 | 0.0000E+00 | 0.0000E+00 | 0.0000E+00 |
| A28: | 0.0000E+00 | 0.0000E+00 | 0.0000E+00 | 0.0000E+00 | 0.0000E+00 | 0.0000E+00 |
| A30: | 0.0000E+00 | 0.0000E+00 | 0.0000E+00 | 0.0000E+00 | 0.0000E+00 | 0.0000E+00 |

Table 10 shows aspheric data in the fifth embodiment. k represents a conic constant in an aspheric curve equation, and A2, A4, A6, A8, A10, A12, A14, A16, A18, A20, A22, A24, A26, A28 and A30 are high-order aspheric coefficients. In addition, definitions of parameters in the following tables are the same as those in the first embodiment, and are not repeated herein.

Referring to Table 9 and Table 10, the following data may be calculated:

| | Fifth embodiment | | |
|---|---|---|---|
| (CA1/CA12)*CRA | 39.81°) | TL*(f*FOV)/CA1 | 919.19 mm*° |
| (IMH/CA12)*CRA | 45.51° | TL*(f3 + f5)/f | 16.84 mm |
| ATAN ((BFL-TDP12)/ (IMH-CA1)) | 66.36° | (TL/IMH)/R2 | 2.09 mm⁻¹ |
| (IMH/CA1)*CRA | 41.35° | TL*SL/f | 16.12 mm |
| TL*(FOV/CRA) | 27.49 mm | TL*EPD/IMH | 2.3 mm |
| TL*(IMH/f) | 8.65 mm | TL*CA1/EPD | 18.6 mm |
| (2*CA2)/R2 | 1.67 | (CA1/CA12)* (TL/IMH) | 3.16 |
| (TL*CRA)/f | 128.47° | | |

Sixth Embodiment

Figure 6A:
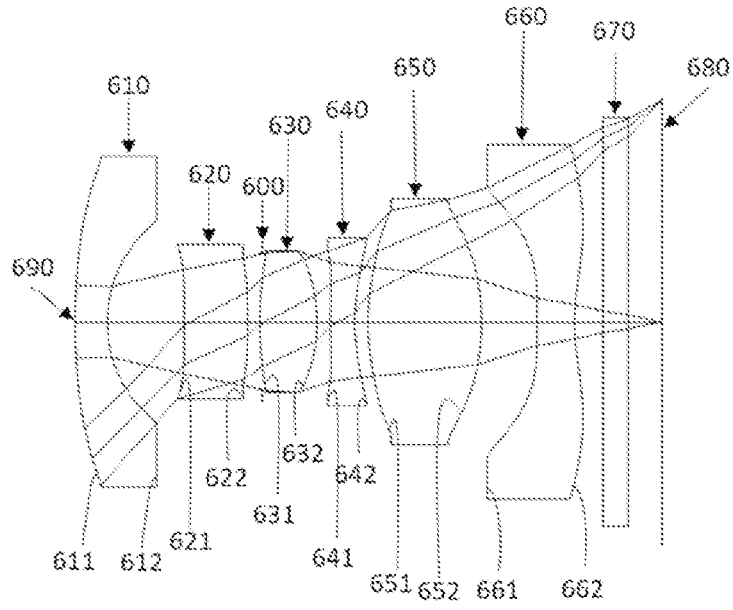
FIG. 6A is a schematic view of an optical lens assembly according to a sixth embodiment of the present disclosure of the present disclosure.
Figure 6B:
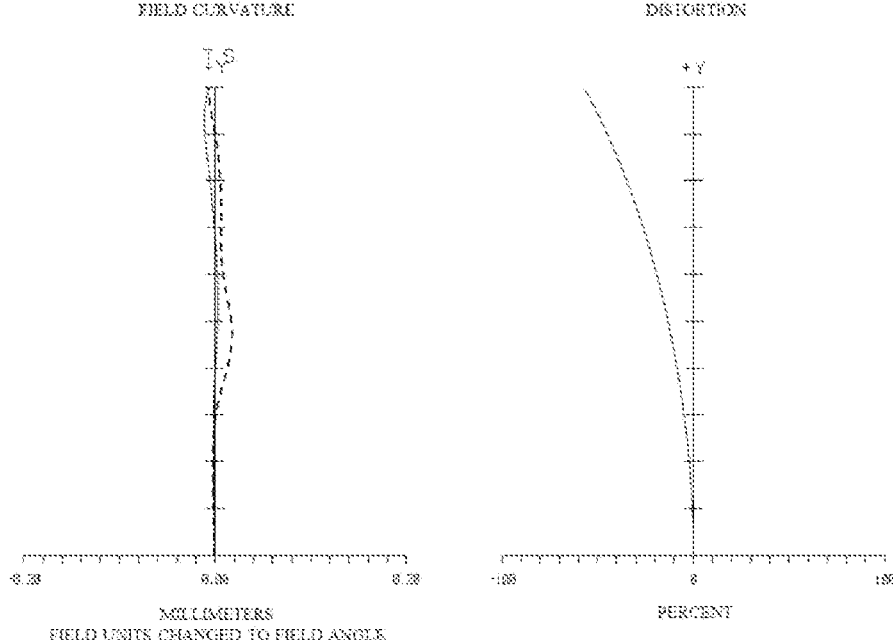
FIG. 6B shows a field curvature curves and a distortion curve of the optical lens assembly according to the sixth embodiment.

Refer to FIG. 6A and FIG. 6B. FIG. 6A is a schematic view of an optical lens assembly according to a fifth embodiment of the present disclosure, and FIG. 6B shows a 10 field curvature curve and a distortion curve of an optical lens assembly according to a second embodiment. As can be seen from FIG. 6A, the optical lens assembly includes, in order from an object side to an image side: a first lens 610, a second lens 620, a stop 600, a third lens 630, a fourth lens 640, a fifth lens 650, a sixth lens 660, an IR-cut filter 670, and an image plane 680. A total quantity of lenses with refractive power in the optical lens assembly is six, but not limited thereto.

The first lens 610 with negative refractive power is made of a glass material and includes an object-side surface 611 and an image-side surface 612, wherein the object-side surface 611 of the first lens 610 is convex near an optical axis 690, and the image-side surface 612 of the first lens 610 is concave near the optical axis 690. The object-side surface 611 and the image-side surface 612 are aspheric.

The second lens 620 with positive refractive power is made of a plastic material and includes an object-side surface 621 and an image-side surface 622, wherein the object-side surface 621 of the second lens 620 is convex near the optical axis 690, and the image-side surface 622 of the second lens 620 is convex near the optical axis 690. The object-side surface 621 and the image-side surface 622 are aspheric.

The third lens 630 with positive refractive power is made of a plastic material and includes an object-side surface 631 and an image-side surface 632, wherein the object-side surface 631 of the third lens 630 is convex near an optical axis 690, and the image-side surface 632 of the third lens 630 is convex near the optical axis 690. The object-side surface 631 and the image-side surface 632 are aspheric.

The fourth lens 640 with negative refractive power is made of a plastic material and includes an object-side surface 641 and an image-side surface 642, wherein the object-side surface 641 of the fourth lens 640 is convex near an optical axis 690, and the image-side surface 642 of the fourth lens 640 is concave near the optical axis 690. The object-side surface 641 and the image-side surface 642 are aspheric.

The fifth lens 650 with positive refractive power is made of a plastic material and includes an object-side surface 651 and an image-side surface 652, wherein the object-side surface 651 of the fifth lens 650 is convex near the optical axis 690, and the image-side surface 652 of the fifth lens 650 is convex near the optical axis 690. The object-side surface 651 and the image-side surface 652 are aspheric.

The sixth lens 660 with negative refractive power is made of a plastic material and includes an object-side surface 661 and an image-side surface 662, wherein the object-side surface 661 of the sixth lens 660 is convex near the optical axis 690, and the image-side surface 662 of the sixth lens 660 is concave near the optical axis 690. The object-side surface 661 and the image-side surface 662 are aspheric.

The IR-cut filter 670 is made of glass, and is disposed between the sixth lens 660 and the image plane 680 without affecting a focal length of the optical lens assembly. It can be understood that, the IR-cut filter 670 may also be formed on the surface of the above-mentioned lens. The IR-cut filter 670 may also be made of other materials.

Refer to Table 11 and Table 12 below.

TABLE 11

Sixth embodiment
f (focal length) = 1.97 mm (millimeters), Fno (f-number) = 2.44,
FOV (field of view) = 141.96° (degrees)

| Surface | | Curvature radius (mm) | | Central thickness/gap (mm) | Material | Refractive index (nd) | Abbe number (vd) | Focal length (mm) |
|---|---|---|---|---|---|---|---|---|
| 0 | Object | Infinity | | 1000000 | | | | |
| 1 | First lens | 7.365 | (ASP) | 0.375 | Glass | 1.81 | 40.73 | −2.09 |
| 2 | | 1.345 | (ASP) | 0.914 | | | | |
| 3 | Second lens | 110.756 | (ASP) | 0.750 | Plastic | 1.64 | 23.97 | 9.01 |
| 4 | | −6.072 | (ASP) | 0.171 | | | | |
| 5 | Stop | Infinity | | −0.035 | | | | |
| 6 | Third lens | 3.293 | (ASP) | 0.671 | Plastic | 1.54 | 55.99 | 2.21 |
| 7 | | −1.770 | (ASP) | 0.165 | | | | |
| 8 | Fourth lens | 6.307 | (ASP) | 0.280 | Plastic | 1.67 | 19.24 | −3.32 |
| 9 | | 1.627 | (ASP) | 0.169 | | | | |
| 10 | Fifth lens | 2.066 | (ASP) | 1.337 | Plastic | 1.54 | 55.99 | 2.31 |
| 11 | | −2.513 | (ASP) | 0.652 | | | | |
| 12 | Sixth lens | 250.000 | (ASP) | 0.450 | Plastic | 1.66 | 20.37 | −2.72 |
| 13 | | 1.803 | (ASP) | 0.330 | | | | |
| 14 | IR-cut filter | Infinity | | 0.300 | Glass | 1.52 | 64.17 | |
| 15 | | Infinity | | 0.400 | | | | |
| 16 | Image Plane | Infinity | | | | | | |

Reference wavelength 555 nm

TABLE 12

Aspheric coefficient

| Surface | 1 | 2 | 3 | 4 | 6 | 7 |
|---|---|---|---|---|---|---|
| K: | 7.3785E+00 | −8.4951E−01 | −1.0000E+02 | 4.7075E+01 | −1.5304E+01 | −8.0698E−01 |
| A2: | 0.0000E+00 | 0.0000E+00 | 0.0000E+00 | 0.0000E+00 | 0.0000E+00 | 0.0000E+00 |
| A4: | 8.6436E−03 | 5.9516E−02 | −1.1927E−01 | −6.6434E−02 | 3.6003E−02 | 1.2649E−03 |
| A6: | 1.9014E−03 | 4.7334E−02 | −2.9449E−01 | −2.6572E−01 | −4.6737E−01 | −2.1587E−01 |
| A8: | −2.2952E−03 | −6.0184E−02 | 2.2276E+00 | 2.3939E+00 | 3.6125E+00 | −1.4325E+00 |
| A10: | 6.7952E−04 | 7.6446E−02 | −1.1242E+01 | −1.3127E+01 | −2.2481E+01 | 1.0478E+01 |
| A12: | −7.8105E−05 | −4.2503E−02 | 3.3173E+01 | 5.7380E+01 | 9.3818E+01 | −3.5981E+01 |
| A14: | 0.0000E+00 | 0.0000E+00 | −5.9040E+01 | −1.6488E+02 | −2.4422E+02 | 7.4240E+01 |
| A16: | 0.0000E+00 | 0.0000E+00 | 6.3012E+01 | 2.8930E+02 | 3.8144E+02 | −9.0942E+01 |
| A18: | 0.0000E+00 | 0.0000E+00 | −3.7047E+01 | −2.7881E+02 | −3.2717E+02 | 5.9594E+01 |
| A20: | 0.0000E+00 | 0.0000E+00 | 9.2065E+00 | 1.1385E+02 | 1.1881E+02 | −1.5506E+01 |

| Surface | 8 | 9 | 10 | 11 | 12 | 13 |
|---|---|---|---|---|---|---|
| K: | −4.2300E+02 | −1.4218E+01 | −8.1381E+00 | 9.3283E−01 | −1.0000E+02 | −1.7616E+01 |
| A2: | 0.0000E+00 | 0.0000E+00 | 0.0000E+00 | 0.0000E+00 | 0.0000E+00 | 0.0000E+00 |
| A4: | 6.7599E−03 | −3.0425E−02 | −1.7201E−01 | −5.1373E−02 | −3.9007E−01 | −8.3548E−02 |
| A6: | −7.7659E−01 | 1.7226E−01 | 4.5894E−01 | 5.2219E−02 | 5.5570E−01 | 3.0249E−02 |
| A8: | 3.0717E+00 | −4.5444E−01 | −8.5771E−01 | −3.9174E−02 | −1.0229E+00 | −1.2030E−02 |
| A10: | −1.3153E+01 | −5.2357E−01 | 1.1423E+00 | −7.8817E−02 | 1.4275E+00 | 1.0203E−02 |
| A12: | 4.0815E+01 | 5.5484E+00 | −8.9483E−01 | 2.7295E−01 | −1.3400E+00 | −8.0703E−03 |
| A14: | −7.9191E+01 | −1.2923E+01 | 3.3230E−01 | −3.4707E−01 | 8.1056E−01 | 3.7400E−03 |
| A16: | 9.0655E+01 | 1.4696E+01 | 5.5010E−03 | 2.3441E−01 | −2.9794E−01 | −9.5143E−04 |
| A18: | −5.5559E+01 | −8.4898E+00 | −4.3288E−02 | −8.1600E−02 | 5.9997E−02 | 1.2382E−04 |
| A20: | 1.3873E+01 | 2.0018E+00 | 9.5930E−03 | 1.1511E−02 | −5.0519E−03 | −6.4592E−06 |

In the sixth embodiment, an aspheric curve equation is expressed as that in the first embodiment. In addition, definitions of parameters in the following tables are the same as those in the first embodiment, and are not repeated herein.

Referring to Table 11 and Table 12, the following data may be calculated:

| Sixth embodiment | | | | |
| --- | --- | --- | --- | --- |
| (CA1/CA12)*CRA | 33.56° | TL*(f*FOV)/CA1 | 1071.86 | mm*° |
| (IMH/CA12)*CRA | 45.15° | TL*(f3 + f5)/f | 15.90 | mm |
| ATAN | 65.71° | (TL/IMH)/R2 | 2.12 | mm$^{-1}$ |
| ((BFL−TDP12)/ | | | | |
| (IMH−CA12)) | | | | |
| (IMH/CA1)*CRA | 48.49° | TL*SL/f | 16.58 | mm |
| TL*(FOV/CRA) | 27.29 mm | TL*EPD/IMH | 2.30 | mm |
| TL*(IMH/f) | 8.56 mm | TL*CA1/EPD | 15.52 | mm |
| (2*CA2)/R2 | 1.66 | (CA1/CA12)* | 2.65 | |
| | | (TL/IMH) | | |
| (TL*CRA)/f | 126.67° | | | |

In the foregoing embodiments, those with ordinary knowledge in the art should understand that, in the optical lens assembly and the photographing module provided in the present disclosure, the lens may be made of glass or plastic. The lens made of glass can increase the degree of freedom of the configuration of the refractive power of the optical lens assembly. The lens made of glass may be made by using related technologies such as grinding, molding, or the like. The lens made of plastic can reduce the production costs.

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

The optical lens assembly provided in the present disclosure can be applicable to an optical system having an ultra-wide-angle, high image quality and miniaturization according to the requirements, and can be used in many technical applications such as photography, monitoring equipment, automation equipment, vehicle surround systems, and electronic imaging systems of the Internet of Things (IOT) devices, but not limited thereto.

What is claimed is:

1. An optical lens assembly comprising a stop, and in order from an object side to an image side, comprising:
   a first lens with negative refractive power, the first lens comprising an object-side surface and an image-side surface, wherein the object-side surface of the first lens is convex near an optical axis;
   a second lens with positive refractive power;
   a third lens with positive refractive power;
   a fourth lens with negative refractive power;
   a fifth lens with positive refractive power; and
   a sixth lens with negative refractive power, the sixth lens comprising an object-side surface and an image-side surface, wherein the image-side surface of the sixth lens is concave near the optical axis;
   wherein a distance from the object-side surface of the first lens to an image plane along the optical axis is TL, a focal length of the system is f, a maximum field of view of the optical lens assembly is FOV, a maximum optical effective radius of the object-side surface of the first lens is CA1, a maximum image height of the optical lens assembly is IMH, and the following condition is satisfied: 702.32 mm*°<TL*(f*FOV)/CA1<1286.23 mm*°, and 6.85 mm<TL*(IMH/f)<11.55 mm.

2. The optical lens assembly according to claim 1, wherein a maximum optical effective radius of the image-side surface of the sixth lens is CA12, an incident angle where a chief ray is incident on an image plane at a maximum view angle of the optical lens assembly is CRA, and the following condition is satisfied: 26.85°<(CA1/CA12)*CRA<53.06°.

3. The optical lens assembly according to claim 1, wherein a maximum image height of the optical lens assembly is IMH, a maximum optical effective radius of the image-side surface of the sixth lens is CA12, an incident angle where a chief ray is incident on an image plane at a maximum view angle of the optical lens assembly is CRA, and the following condition is satisfied: 34.51°<(IMH/CA12)*CRA<58.29°.

4. The optical lens assembly according to claim 1, wherein a distance from the image-side surface of the sixth lens to the image plane along the optical axis is BFL, a distance in parallel with the optical axis from an axial point on the image-side surface of the sixth lens to a maximum optical effective radius position of the image-side surface of the sixth lens is TDP12, a maximum image height of the optical lens assembly is IMH, a maximum optical effective radius of the image-side surface of the sixth lens is CA12, and the following condition is satisfied: 51.3<ATAN((BFL−TDP12)/(IMH−CA12))<85.83°.

5. The optical lens assembly according to claim 1, wherein a maximum image height of the optical lens assembly is IMH, an incident angle where a chief ray is incident on an image plane at a maximum view angle of the optical lens assembly is CRA, and the following condition is satisfied: 30.55°<(IMH/CA1)*CRA<58.19°.

6. The optical lens assembly according to claim 5, wherein an entrance pupil diameter of the optical lens assembly is EPD, and the following condition is satisfied: 12.42 mm<TL*CA1/EPD<26.15 mm.

7. The optical lens assembly according to claim 1, wherein an incident angle where a chief ray is incident on an image plane at a maximum view angle of the optical lens assembly is CRA, and the following condition is satisfied: 21.84 mm<TL*(FOV/CRA)<38.12 mm.

8. The optical lens assembly according to claim 7, wherein the following condition is satisfied: 101.34°<(TL*CRA)/f<175.96°.

9. The optical lens assembly according to claim 1, wherein an entrance pupil diameter of the optical lens assembly is EPD, and the following condition is satisfied: 1.65 mm<TL*EPD/IMH<2.76 mm.

10. The optical lens assembly according to claim 1, wherein a maximum optical effective radius of the image-side surface of the first lens is CA2, a curvature radius of the image-side surface of the first lens is R2, a maximum image height of the optical lens assembly is IMH, and the following condition is satisfied: 1.33<(2*CA2)/R2<2.27.

11. The optical lens assembly according to claim 1, wherein a maximum optical effective radius of the image-side surface of the sixth lens is CA12, a maximum image height of the optical lens assembly is IMH, and the following condition is satisfied: 2.12<(CA1/CA12)*(TL/IMH)<4.10.

12. The optical lens assembly according to claim 1, wherein a focal length of the third lens is f3, a focal length of the fifth lens is f5, and the following condition is satisfied: 12.72 mm<TL*(f3+f5)/f<25.74 mm.

13. The optical lens assembly according to claim 1, wherein a maximum image height of the optical lens assembly is IMH, a curvature radius of the image-side surface of the first lens is R2, and the following condition is satisfied: 1.62 mm$^{-1}$<(TL/IMH)/R2<2.75 mm$^{-1}$.

14. The optical lens assembly according to claim 1, wherein a distance from the stop to the image plane along the optical axis is SL, and the following condition is satisfied: 12.9 mm<TL*SL/f<21.33 mm.

* * * * *